United States Patent [19]

Vink et al.

[11] Patent Number: 5,926,777
[45] Date of Patent: Jul. 20, 1999

[54] METHOD AND APPARATUS FOR MONITORING COMPUTER SYSTEM SERVICE LIFE PARAMETERS

[75] Inventors: Anthony B. Vink, Plymouth Township; Yulei Chen, Detroit, both of Mich.

[73] Assignee: Nematron Corporation, Ann Arbor, Mich.

[21] Appl. No.: 08/949,701

[22] Filed: Oct. 14, 1997

[51] Int. Cl.[6] .............................. G01K 1/02; G01K 13/00
[52] U.S. Cl. .................... 702/130; 702/182; 702/186; 702/187; 395/838; 360/31
[58] Field of Search .................................. 702/130, 132, 702/179, 182, 183, 184, 185, 186, 188; 395/184.01, 185.01, 835, 838; 360/31

[56] References Cited

U.S. PATENT DOCUMENTS

| 5,367,670 | 11/1994 | Ward et al. | 395/575 |
| 5,437,163 | 8/1995 | Jurewicz et al. | 62/126 |
| 5,506,792 | 4/1996 | Adelson et al. | 364/570 |
| 5,521,849 | 5/1996 | Adelson et al. | 364/570 |
| 5,581,482 | 12/1996 | Wiedenman et al. | 364/551.01 |
| 5,590,056 | 12/1996 | Barritz | 364/550 |
| 5,630,048 | 5/1997 | LaJoie et al. | 395/183.01 |
| 5,644,707 | 7/1997 | Chen | 395/185.1 |
| 5,737,742 | 4/1998 | Achiwa et al. | 711/103 |
| 5,748,882 | 5/1998 | Huang | 395/184.01 |
| 5,867,809 | 2/1999 | Soga et al. | 702/130 |

*Primary Examiner*—Patrick Assouad
*Attorney, Agent, or Firm*—Howard & Howard

[57] ABSTRACT

A method and apparatus for monitoring service life parameters of a computer system 10 includes a processor 72 connected to sensors 78, 80, 82, 84, a control memory 74 having an operating program stored therein and a data memory 76 having a finite write life. The sensors 78, 80, 82, 84 sense operating parameters of the computer system 10 and generate sensor signals to which the processor 72 responds by generating a data signal. The data memory 76 responds to the data signal by storing information related to the predetermined operating parameter as a data log. The processor 72 generates the data signal in a manner that maximizes the write life of the data memory 76.

22 Claims, 2 Drawing Sheets

METHOD AND APPARATUS FOR MONITORING COMPUTER SYSTEM SERVICE LIFE PARAMETERS

TECHNICAL FIELD

The subject invention relates to a method and apparatus for monitoring and logging operating parameters a computer system which parameters affect the service life of the system.

BACKGROUND OF THE INVENTION

It is desirable to be able to predict failures and the life of a computer system, especially when the system is controlling a manufacturing process. Various operating parameters of computer systems are indicative of impending failures and system life. For example, high or low temperatures may indicate the imminent failure of a system component. The number of times the power is turned on and off can be a measure of system life.

Several attempts have been made to monitor computer system operating parameters. The U.S. Pat. No. 5,367,670 issued to Ward et al. shows a computer system manager for monitoring events and operating parameters including temperature and power. The U.S. Pat. No. 5,581,482 issued to Wiedenman et al. shows a computer system performance monitor which utilizes separate performance monitoring hardware units placed throughout a computer system and separate from the system CPU. The U.S. Pat. No. 5,590,056 issued to Barritz shows a computer event monitor which records events in an event log from which an output report can be generated.

SUMMARY OF THE INVENTION AND ADVANTAGES

The invention concerns an apparatus for monitoring and logging data related to operating parameters of a computer system such as an industrial workstation. The apparatus includes: a control memory in which a software program is stored; a processor connected to the control memory and operating under control of the software program; at least one of a general sensor, a temperature sensor, a back light sensor and a power sensor connected to the processor for generating the sensor signal representing a predetermined operating parameter of the computer system; and a data memory connected to the processor and having a finite write life, the data memory being responsive to the data signal for storing information related to the predetermined operating parameter as a data log whereby the processor is responsive to the sensor signal for generating the data signal in a manner that maximizes the write life of the data memory.

The present invention also concerns a method for monitoring and logging data related to operating parameters of the computer system, comprising the steps of: a. providing the control memory and storing the software program therein; b. connecting the processor to the control memory and operating the processor under control of the software program; c. connecting at least one of the sensors to the processor for generating the sensor signal representing a predetermined operating parameter of the computer system; d. connecting the data memory having a finite write life to the processor, the data memory being responsive to the data signal for storing information related to the predetermined operating parameter as a data log; and e. operating the processor in response to the sensor signal to generate the data signal in a manner that maximizes the write life of the data memory.

The present invention overcomes the disadvantages of prior art by processing operating parameter data in the manner which maximizes the "write life" of the memory.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
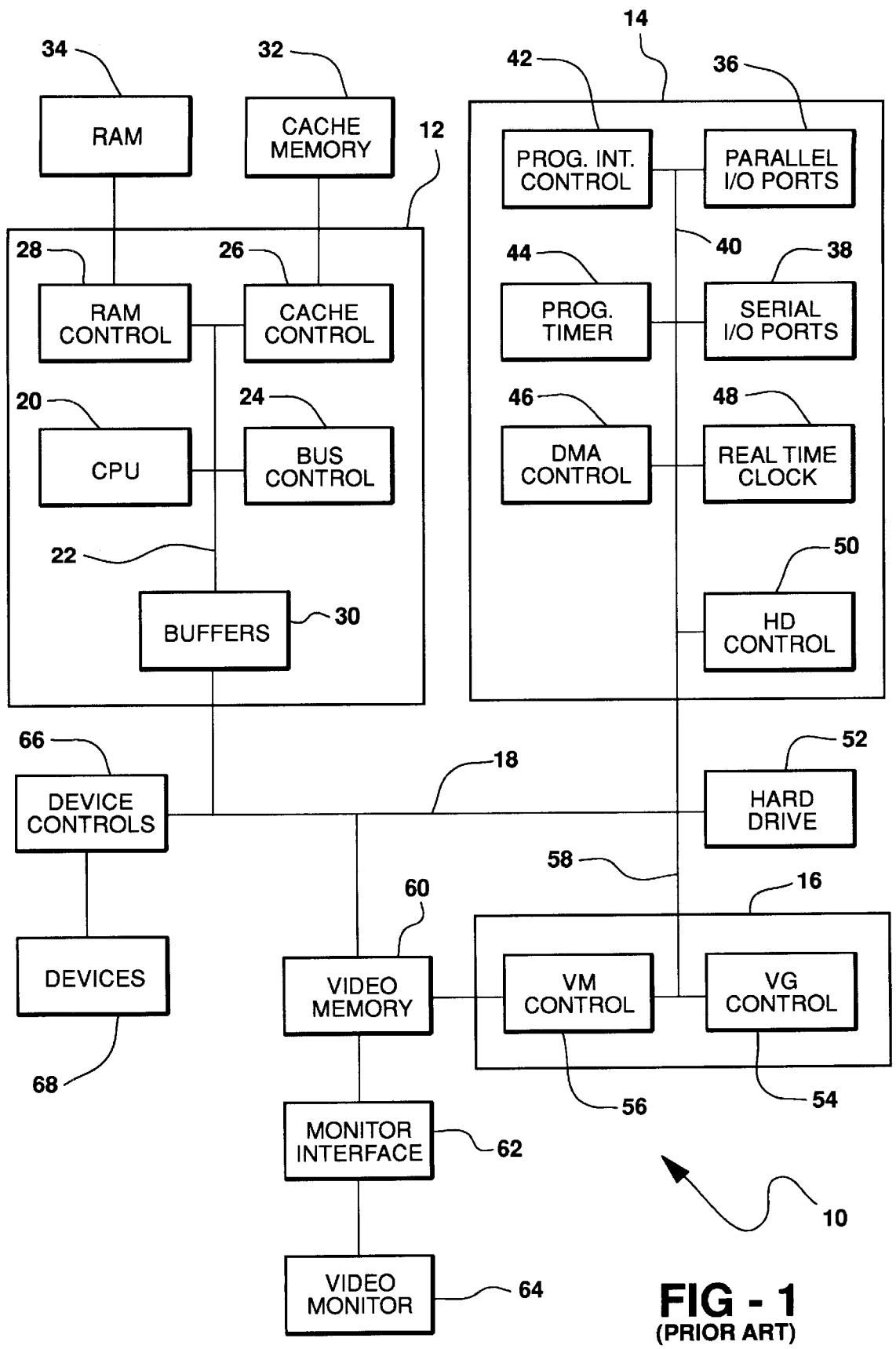
FIG. 1 is a schematic block diagram of a typical prior art microprocessor based computer system.

There is shown in the FIG. 1 a schematic block diagram of a typical microprocessor based computer system 10. The system 10 includes an expanded central processing unit 12, an input/output unit 14 and a graphics interface unit 16 each connected to a main bus 18. The expanded central processing unit 12 has a central processing unit (CPU) 20 connected to a CPU bus 22. The expanded central processing unit 12 also includes a bus control 24, a cache control 26 and a RAM control 28 each connected to the bus 22. The bus 22 is connected for communication to the main bus 18 through a plurality of line buffers 30. A cache memory 32, external to the expanded central processing unit 12, is connected to and controlled by the cache control 26. Similarly, a random access memory (RAM) 34 is located external to the expanded central processing unit 12 and is connected to and controlled by the RAM control 28.

The input/output unit 14 includes parallel I/O ports 36 and serial I/O ports 38 connected to an I/O bus 40 which in turn is connected to the main bus 18. The input/output unit 14 further includes a programmable interrupt control 42, a programmable timer 44, a direct memory access control 46, a real time clock unit 48 and a hard drive control 50 all connected to the input/output unit bus 40. External to the input/output unit 14 and connected to the main bus 18 is a hard drive 52 which is controlled by the hard drive control 50. The hard drive 52 and the associated control 50 represent any type of mass storage device suitable for use with a microprocessor based computer.

The graphics interface unit 16 includes a video graphics control 54 and a video memory control 56 connected to a graphics bus 58 which in turn is connected to the main bus 18. External to the graphics interface unit 16 is a video memory 60 which is connected to the video memory control 56 and to the main bus 18. The video memory 60 can be accessed by the video memory control 56 and through the main bus 18. A monitor interface 62 is connected between the video memory 60 and a video monitor 64. Also connected to the main bus 18 are one or more device controls 66 which in turn are connected to associated devices 68. The controls 66 and the devices 68 can include a network communication adapter card, a printer interface, a keyboard interface, a mouse interface, a floppy drive, a CD-ROM drive, a tape drive, etc.

The CPU 20 includes logic for executing a plurality of program instructions and for executing a plurality of hardware and software interrupts. The hardware and software interrupts occur as the result of external events and system traps. Interrupts are serviced after execution of the current instruction in accordance with an interrupt service routine. The interrupts are classified into two types: maskable and non-maskable. Maskable interrupts are typically used to respond to asynchronous external hardware events and non-maskable interrupts are typically used to service very high priority events.

The computer system 10 can be an ICC Workstation available from Nematron Corporation of Ann Arbor, Mich. According to the present invention, the Nematron ICC Workstation 10 is provided with software for monitoring and logging various operational parameters affecting the life of the unit such as the internal temperature, back light "on" time and system "on" time. Sensors are connected to an embedded microprocessor which is programmed to process the sensor data and store selected information in a non-volatile memory as a data log including a thermal/time profile. The software writes to the memory in a manner that maximizes the "write life" of the storage device. The data log can be interrogated by authorized personnel.

Figure 2:
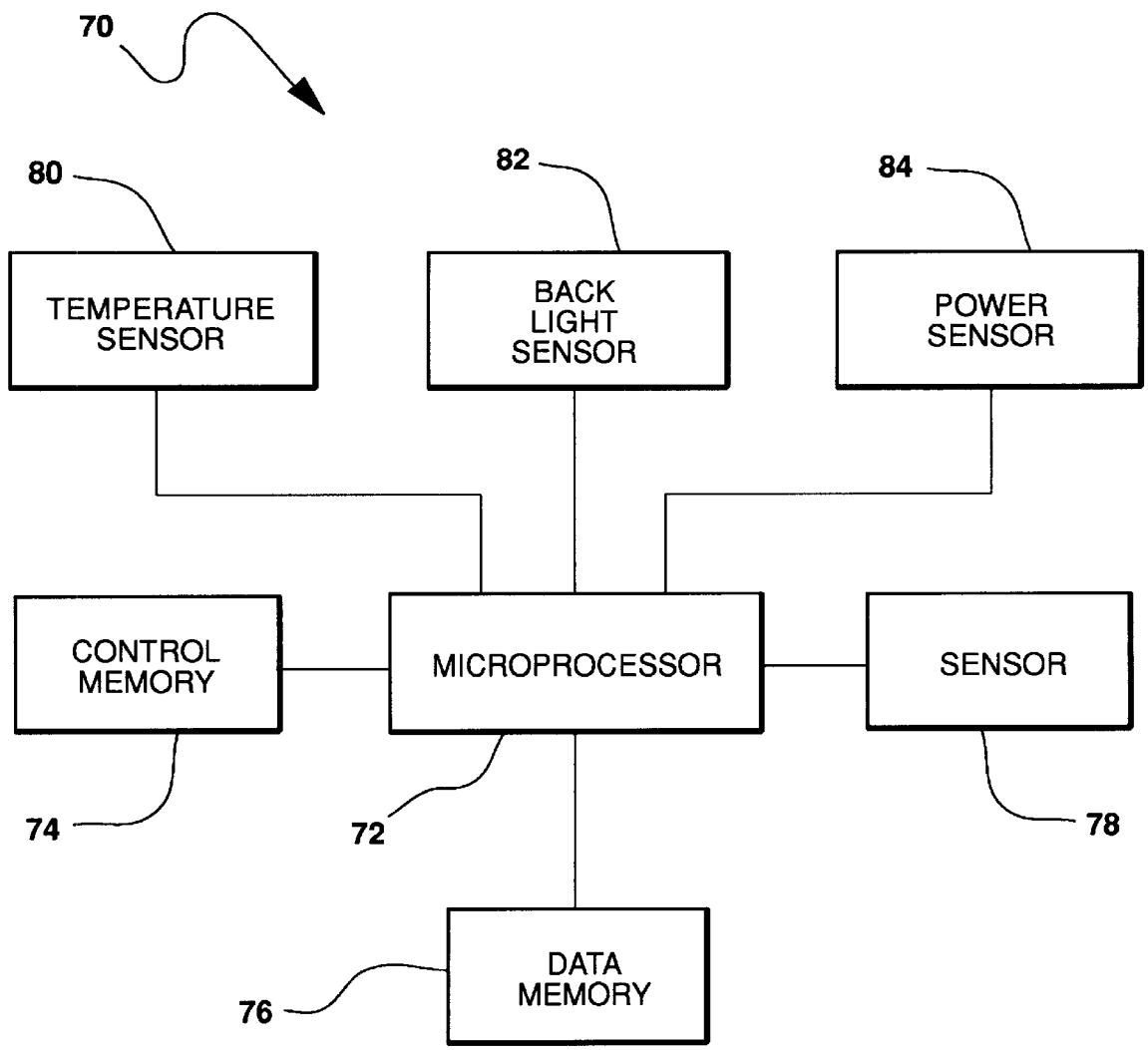
FIG. 2 is a schematic block diagram of a monitor apparatus according to the present invention for use with the computer system shown in the FIG. 1.

There is shown in the FIG. 2 a monitor apparatus 70 for monitoring and logging selected operational parameters of the computer system 10 in accordance with the present invention. The apparatus 70 includes a microprocessor 72 which is operated under the control of a software program stored in a control memory 74 connected to the microprocessor. Microprogramming is a technique for implementing the control function of a processor in a systematic and flexible manner. Microprogramming may be considered as an alternative to hard wired control. Each instruction of the processor 72 being controlled causes a sequence of microinstructions, called a microprogram, to be fetched from a special ROM or RAM, the control memory 74. The microinstructions specify the sequence of microoperations or register transfer operations needed to interpret and execute the main instruction. Each instruction fetch from main memory thus initiates a sequence of microinstruction fetches from the control memory 74.

Microprogramming provides a simpler and more systematic way of designing control circuits and generally increases the flexibility of a computer. The instruction set of a microprogram machine can be changed by merely changing the contents of the control memory 74. Microprogrammed control units tend to be more costly and slower than hard wired units, but these drawbacks are generally outweighed by the greater flexibility provided by microprogramming. Because of the close interaction of software and hardware in microprogram systems, microprograms are sometimes referred to as "firmware".

Also connected to the microprocessor 72 is a data memory 76 for storing the data related to the operation parameters being monitored. A physical process that can destroy the contents of a memory is the failure of its power supply. A memory is said to be volatile if the stored information can be destroyed by a power failure. Most semiconductor memories are volatile, while most magnetic memories are nonvolatile. Since it is important to save the program and the stored data, the memories 74 and 76 are of the nonvolatile type. Although the memories 74 and 76 are shown as separate devices, they can be combined.

The monitor apparatus 70 renders the Nematron ICC Workstation 10 capable of monitoring and logging various operational parameters affecting the service life of the unit. These parameters include internal temperature, back light on time, and system on time. The data log can be interrogated by authorized service personnel, and at manufacturer's discretion, the OEM or end customer. An operating parameter to be monitored is sensed by an appropriate sensor 78 which generates a sensor signal having a characteristic representing a value of the operating parameter. The sensor signal is read by the microprocessor 72 which generates a data signal to the data memory 76 for storage in a log.

More specifically, the internal temperature of the workstation 10 is measured at a predetermined single point by a temperature sensor 80 connected to the microprocessor 72. The sensor 80 is mounted in the workstation 10 at the point and generates a temperature sensor signal representing the actual temperature at the point. The microprocessor 72 reads the sensor signal and generates a thermal data signal which is stored in the data memory 76. The microprocessor 72 extrapolates thermal data for additional points within the workstation 10 from the single point measurement based on established thermal profile data. However, additional temperature sensors could be included for additional points of measurement should the need for more accurate measurement arise. The software program stored in the memory 74 creates a temperature log which records the highest operational temperature reached within the unit 10, the lowest operational temperature reached within the unit, and a thermal/time profiling wherein several temperature bands are defined and the actual operational time spent within each of those bands is accumulated.

The monitor apparatus 70 monitors the back light on time utilizing a back light sensor 82 connected to the microprocessor 72. The sensor 82 detects the signal utilized by the workstation 10 to turn on the back light bulb and generates a back light sensor signal representing the actual on/off state of the light. The microprocessor 72 reads the sensor signal and generates a back light data signal which is stored in the memory 76. The software program stored in the memory 74 creates a log of the cumulative amount of time that the bulb is powered on.

The monitor apparatus 70 monitors the power on time utilizing a power sensor 84 connected to the microprocessor 72. The sensor 84 directly or indirectly detects the system power applied to the workstation 10 and generates a power sensor signal representing the actual on/off state of the system power. The microprocessor 72 reads the sensor signal and generates a power data signal which is stored in the memory 76. The software program stored in the memory 74 creates a log of the cumulative amount of time that the system power is on.

The software algorithms programmed into the control memory 74 of the embedded microprocessor 72 are responsible for accessing sensor data, processing the data, and storing the appropriate information in the data memory 76. The data memory 76 must be capable of retaining the information for the life of the workstation 10. The logged data must be accurately retained whether the workstation 10 is in operation or is powered down. To maintain a low cost implementation, a technology may be chosen which exhibits a limited "write cycle lifetime". However, the nonvolatile data memory 76 should be capable of accepting a significant minimum number of store operations (e.g., 1,000,000 store operations) to each data storage location.

The software periodically interrogates the thermal sensing device 80 so that a current temperature value can be maintained. This interrogation must be performed at a rate which is frequent enough to ensure that short duration thermal fluctuations are detected. Also, the thermal sensor 80 must be interrogated at a rate that does not overburden the microprocessor 72. The software maintains HIGH and LOW values for the measured thermal data. Additionally, the software stratifies the measured thermal data into several pre-defined temperature bands. The range and number of temperature bands is solely a function of the precision desired, and the amount of nonvolatile storage available. The information stored for each temperature band is the accumulated time that the workstation 10 spends within the given band. The software algorithms are responsible for storing thermal data into the nonvolatile data memory 76. This is accomplished at a rate frequent enough to insure that important data is not lost and yet infrequent enough that the store operation limit of the data memory 76 is not exceeded.

The software must write to the data memory 76 in a manner that maximizes the "write life" of the storage device. The following elements are integral to the wear leveling software algorithm: a) constantly changing data is written to storage only after a pre-defined "magnitude of change" threshold has been surpassed (Alternatively, a minimum time may be specified between storage cycles.); b) thermal data is stratified so that separate areas of memory may be used for each temperature range; c) time values are stored via counters that increment using a special sequence so that the minimum number of write cycles per byte occur to the data memory; d) data is written to memory only if the value to be written is different than the existing memory content; and e) the software keeps track of the number of times that the memory is written (This may be accomplished indirectly by defining the size of each memory counter sufficiently large such that overflow will not occur within the expected life of the workstation.).

Assuming a minimum capability of 1,000,000 store operations for the data memory 76, the following scheme would allow an update every minute for 11 years. Data is stored in a 6 byte special format code counter. The count is incremented at a maximum rate of once per minute during the time that the associated condition is occurring. Since a code is used, storage operations are evenly distributed over each byte. In 11 years, a maximum of 5,785,560 counts will occur and will require approximately 964,260 storage cycles to each byte.

The count is not limited by the number of bytes allocated for storage, but by the number of storage cycles. For example, a 6 byte counter could count $2^{48}$ times. Distributed evenly over 6 bytes, this would require over $2^{46}$ storage cycles for each byte, which would exceed the 1,000,000 write cycle limitation of the technology. Counter overflow will not occur until somewhat past the end of the life of the workstation 10 and/or the "write life" of the data memory 76. Each byte is divided into two parts: an upper four bits (U4) and lower four bits (L4). The Byte 3(U4), Byte 2(U4), Byte 1(U4) and Byte 0(U4) construct a sixteen bit code. The Byte 5(L4), Byte 4(L4), Byte 3(L4), Byte 2(L4), Byte 1(L4) and Byte 0(L4) act individually as counters, each increasing from 00H to 0FH one by one, starting from Byte 5(L4) to Byte 0(L4), then decreasing from 0FH to 00H one by one starting from Byte 5(L4) to Byte 0(L4). This gives 180 counts evenly distributed in six bytes. Every time the Byte 0(L4) returns to 00H, it causes a CARRY, increasing the sixteen bit code by one.

In summary, the present invention is the apparatus 70 for monitoring and logging data related to operating parameters of the computer system 10 which includes: the control memory means 74 in which the software program is stored; the processing means 72 connected to the control memory means 74 and operating under control of the software program; at least one of the sensor means 78, 80, 82, 84 connected to the processing means 72 for generating the sensor signal representing the predetermined operating parameter of the computer system 10; and the data memory means 76 connected to the processing means (72) and having a finite write life, the data memory means being responsive to the data signal for storing information related to the predetermined operating parameter as the data log whereby the processing means is responsive to the sensor signal for generating the data signal in a manner that maximizes the write life of the data memory means. The data memory means 76 can be a nonvolatile memory.

The sensor means can be the temperature sensor 80 adapted to be mounted in the computer system 10 for generating the sensor signal representing the temperature at the predetermined point in the computer system. The processor means 72 stores in the data memory means 76 a temperature log including at least one of the highest operational temperature reached in the computer system 10, the lowest operational temperature reached in the computer system and the thermal/time profile representing operational time spent in each of at least two temperature bands. The processor means 72 extrapolates the temperature for at least one other point in the computer system 10 from the sensor signal utilizing thermal profile data stored in the control memory means 74 and stores in the data memory means 76 the log of the extrapolated temperature.

The sensor means can be the back light sensor 80 adapted to be mounted in the computer system 10 for generating the sensor signal representing the on/off state of the back light bulb in the computer system and the processing means 72 stores in the data memory means 76 the log of the cumulative amount of time that the back light bulb is powered on. The sensor means can be the power sensor 84 adapted to be mounted in the computer system 10 for generating the sensor signal representing the on/off state of the system power to the computer system and the processing means 72 stores in the data memory means 76 the log of the cumulative amount of time that the system power is on.

The processing means 72 maximizes the write life of the data memory means 76 by one or more of the following methods: generating the data signal in response to a predetermined magnitude of change in a value of the operating parameter being sensed; generating the data signal periodically at a predetermined rate; the temperature sensor 80 is adapted to be mounted in the computer system 10 for generating the sensor signal representing the temperature at the predetermined point in the computer system and the processing means generates the data signal as stratified thermal data in at least two temperature ranges and writes the thermal data in separate areas of the data memory means for each of the temperature ranges; providing a plurality of code counters that increment using a predetermined sequence so that a minimum number of write cycles per byte occurs to the data memory means; writing the data signal to the data memory means only if the information represented by the data signal is different than corresponding information stored in the memory means; and providing a plurality of code counters sufficiently large such that overflow of the data memory means will not occur within an expected life of the computer system.

The present invention also is the method for monitoring and logging data related to operating parameters of the computer system 10, comprising the steps of: a. providing the control memory means 74 and storing a software program therein; b. connecting the processing means 72 to the control memory means 74 and operating the processing means under control of the software program; c. connecting at least one of the sensor means 78, 80, 82, 84 to the processing means 72 for generating the sensor signal representing a predetermined operating parameter of the computer system 10; d. connecting the data memory means 76 having a finite write life to the processing means 72, the data memory means being responsive to the data signal for storing information related to the predetermined operating parameter as a data log; and e. operating the processing means 72 in response to the sensor signal to generate the data signal in a manner that maximizes the write life of the data memory means.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An apparatus (70) for monitoring and logging data related to operating parameters of a computer system (10) comprising:

a control memory means (74) in which a software program is stored;

a processing means (72) connected to the control memory means (74) and operating under control of said software program;

at least one sensor means (78, 80, 82, 84) connected to said processing means (72) for generating a sensor signal representing a predetermined operating parameter of a computer system (10); and a data memory means (76) connected to said processing means (72) and having a finite write life, said data memory means being responsive to a data signal for storing information related to the predetermined operating parameter as a data log whereby said processing means is responsive to said sensor signal for generating said data signal in a manner that maximizes the write life of said data memory means.

2. The apparatus according to claim 1 wherein said data memory means (76) is a nonvolatile memory.

3. The apparatus according to claim 1 wherein said sensor means (78, 80, 82, 84) is a temperature sensor (80) adapted to be mounted in the computer system (10) for generating said sensor signal representing a temperature at a predetermined point in the computer system.

4. The apparatus according to claim 3 wherein said processor means (72) stores in said data memory means (76) a temperature log including at least one of a highest operational temperature reached in the computer system (10), a lowest operational temperature reached in the computer system and a thermal/time profile representing operational time spent in each of at least two temperature bands.

5. The apparatus according to claim 3 wherein said processor means (72) extrapolates a temperature for at least one other point in the computer system (10) from said sensor signal utilizing thermal profile data stored in said control memory means (74) and stores in said data memory means (76) a log of the extrapolated temperature.

6. The apparatus according to claim 1 wherein said sensor means (78, 80, 82, 84) is a back light sensor (82) adapted to be mounted in the computer system (10) for generating said sensor signal representing an on/off state of a back light bulb in the computer system and said processing means (72) stores in said data memory means (76) a log of the cumulative amount of time that the back light bulb is powered on.

7. The apparatus according to claim 1 wherein said sensor means (78, 80, 82, 84) is a power sensor (84) adapted to be mounted in the computer system (10) for generating said sensor signal representing an on/off state of a system power to the computer system and said processing means (72) stores in said data memory means (76) a log of the cumulative amount of time that the system power is on.

8. The apparatus according to claim 1 wherein said processing means (72) maximizes the write life of said data memory means (76) by generating said data signal in response to a predetermined magnitude of change in a value of the operating parameter being sensed.

9. The apparatus according to claim 1 wherein said processing means (72) maximizes the write life of said data memory means (76) by generating said data signal periodically at a predetermined rate.

10. The apparatus according to claim 1 wherein said sensor means (78, 80, 82, 84) is a temperature sensor (80) adapted to be mounted in the computer system (10) for generating said sensor signal representing a temperature at a predetermined point in the computer system (10) and said processing means (72) maximizes the write life of said data memory means (76) by generating said data signal as stratified thermal data in at least two temperature ranges and writing the thermal data in separate areas of said data memory means for each of the temperature ranges.

11. The apparatus according to claim 1 wherein said processing means (72) maximizes the write life of said data memory means (76) by providing a plurality of code counters that increment using a predetermined sequence so that a minimum number of write cycles per byte occurs to said data memory means.

12. The apparatus according to claim 1 wherein said processing means (72) maximizes the write life of said data memory means (76) by writing said data signal to said data memory means only if the information represented by said data signal is different than corresponding information stored in said memory means.

13. The apparatus according to claim 1 wherein said processing means (72) maximizes the write life of said data memory means (76) by providing a plurality of code counters sufficiently large such that overflow of said data memory means will not occur within an expected life of the computer system (10).

14. A method for monitoring and logging data related to operating parameters of a computer system (10), comprising the steps of:

a. providing a control memory means (74) and storing a software program therein;

b. connecting a processing means (72) to the control memory means (74) and operating the processing means under control of the software program;

c. connecting at least one sensor means (78, 80, 82, 84) to the processing means (72) for generating a sensor signal representing a predetermined operating parameter of a computer system (10);

d. connecting a data memory means (76) having a finite write life to the processing means (72), the data memory means being responsive to a data signal for storing information related to the predetermined operating parameter as a data log; and e. operating the processing means (72) in response to the sensor signal to generate the data signal in a manner that maximizes the write life of the data memory means.

15. The method according to claim 14 wherein the sensor means (78, 80, 82, 84) is a temperature sensor (80) adapted to be mounted in the computer system (10) for generating said sensor signal representing a temperature at a predetermined point in the computer system and said step d. is performed by storing in the data memory means (76) a temperature log including at least one of a highest operational temperature reached in the computer system, a lowest operational temperature reached in the computer system and a thermal/time profile representing operational time spent in each of at least two temperature bands.

16. The method according to claim 15 wherein the processor means (72) extrapolates a temperature for at least one other point in the computer system (10) from the sensor signal utilizing thermal profile data stored in the control memory means (74) and stores in the data memory means (76) a log of the extrapolated temperature.

17. The method according to claim 14 wherein said step e. is performed by the processing means (72) generating the data signal in response to a predetermined magnitude of change in a value of the operating parameter being sensed.

18. The method according to claim 14 wherein said step e. is performed by the processing means (72) generating the data signal periodically at a predetermined rate.

19. The method according to claim 14 wherein the sensor means (78, 80, 82, 84) is a temperature sensor (80) adapted to be mounted in the computer system (10) for generating the sensor signal representing a temperature at a predetermined point in the computer system and said step e. is performed by the processing means (72) generating the data signal as stratified thermal data in at least two temperature ranges and writing the thermal data in separate areas of the data memory means for each of the temperature ranges.

20. The method according to claim 14 wherein said step e. is performed by the processing means (72) providing a plurality of code counters that increment using a predetermined sequence so that a minimum number of write cycles per byte occurs to the data memory means (76).

21. The method according to claim 14 wherein said step e. is performed by the processing means (72) writing the data signal to the data memory means (76) only if the information represented by the data signal is different than corresponding information stored in the data memory means.

22. The method according to claim 14 wherein said step e. is performed by the processing means (72) providing a plurality of code counters sufficiently large such that overflow of the data memory means (76) will not occur within an expected life of the computer system (10).

* * * * *